Sept. 1, 1931. H. B. BARKER 1,821,538
METHOD AND MEANS FOR PRODUCING ILLUMINATED MOTION EFFECTS
Filed March 10, 1926 2 Sheets-Sheet 1
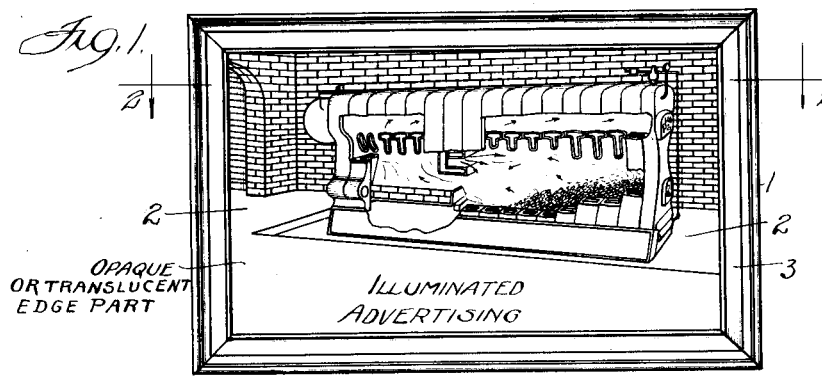
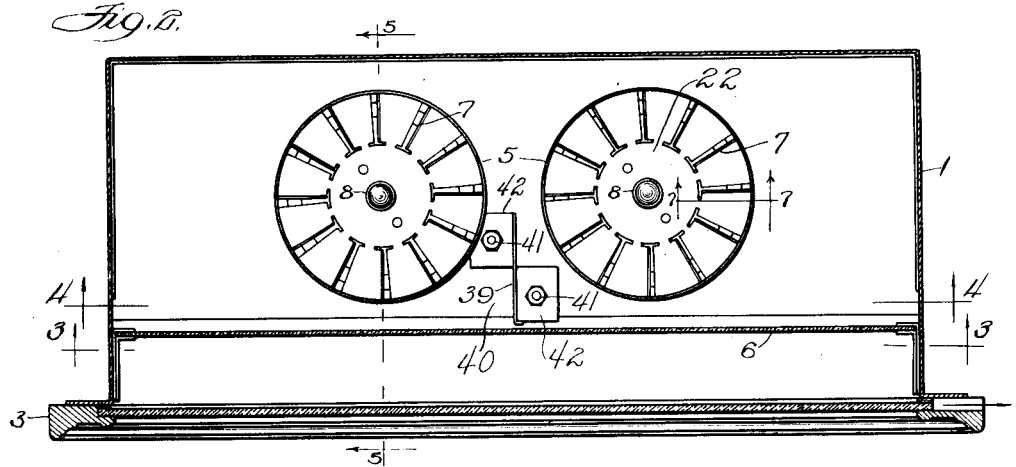
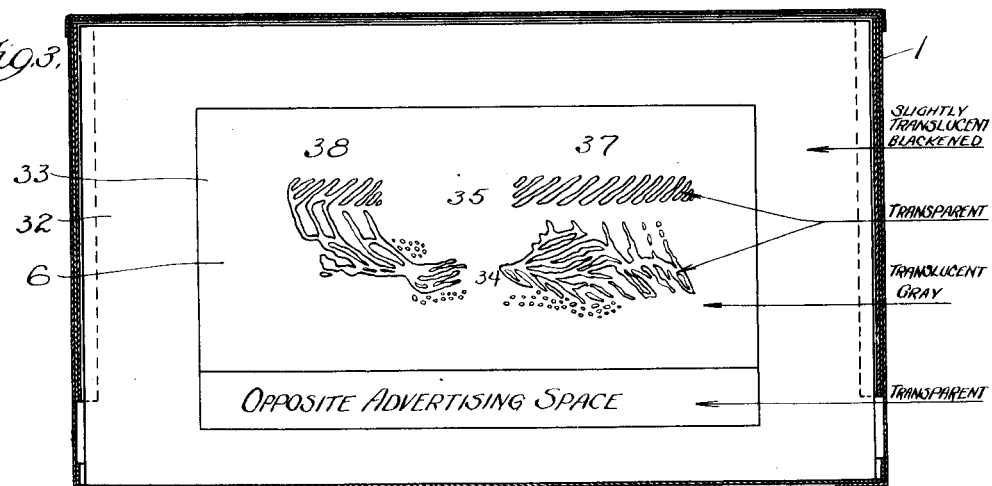
Inventor:
HARRY B. BARKER Sept. 1, 1931. H. B. BARKER 1,821,538
METHOD AND MEANS FOR PRODUCING ILLUMINATED MOTION EFFECTS
Filed March 10, 1926 2 Sheets-Sheet 2
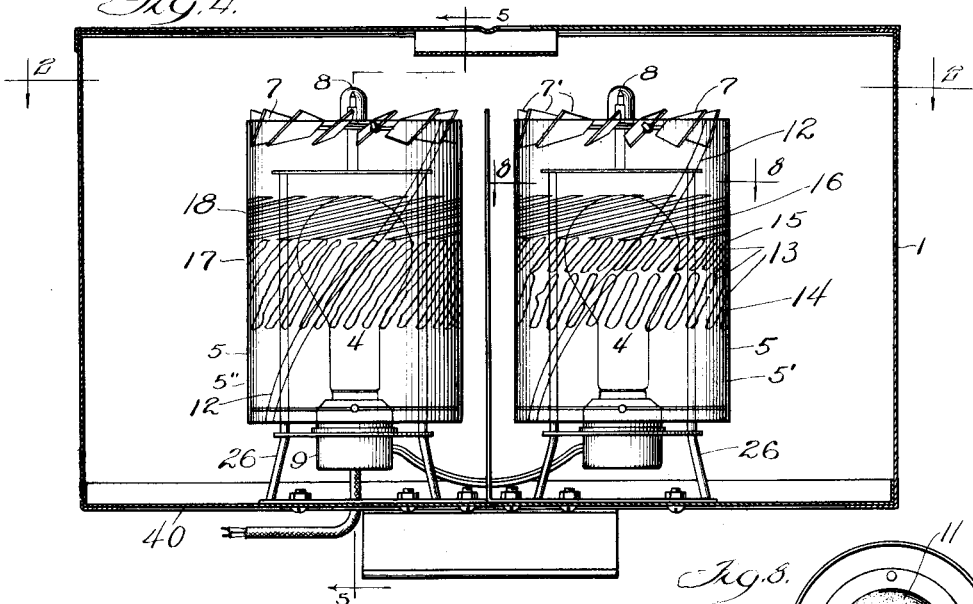
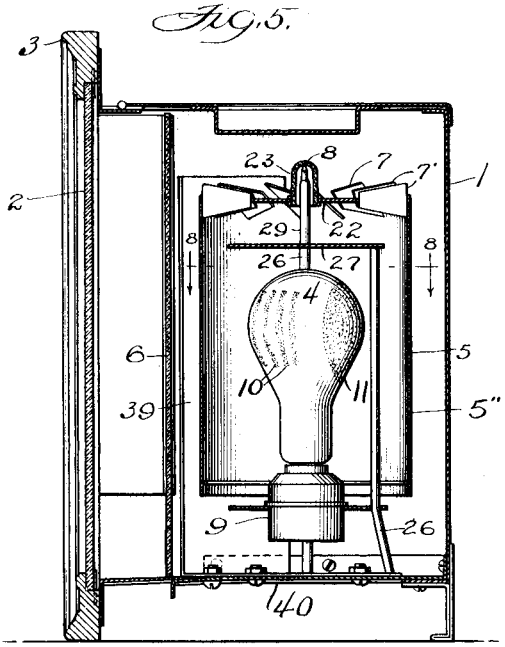
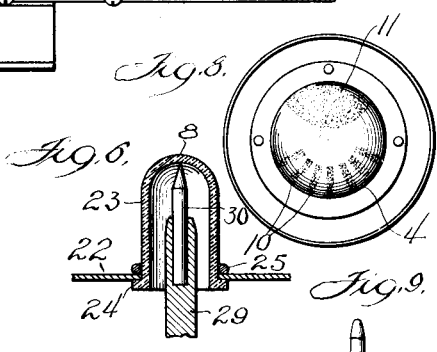
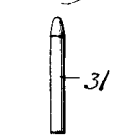
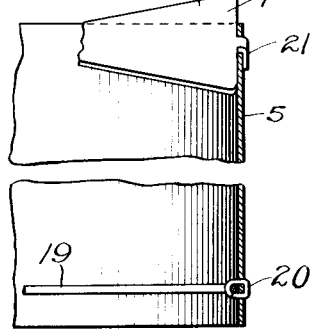

Patented Sept. 1, 1931

1,821,538

UNITED STATES PATENT OFFICE

HARRY B. BARKER, OF CHICAGO, ILLINOIS

METHOD AND MEANS FOR PRODUCING ILLUMINATED MOTION EFFECTS

Application filed March 10, 1926. Serial No. 93,693.

This invention relates to methods and means for producing animated pictorial effects involving a combination of mechanical movements and artificial illumination, and more especially to transparencies for picturing motion.

The main objects of the invention are to provide an improved form of pictured motion transparency device; to provide a method and means adapted for producing an illusory pictorial simulation of scenic motion effects, both natural and artificial, of a complicated nature, involving a series of steps or kinds of motion and a chain of means adapted for operating continuously; to provide in relatively movable association one or more light sources in combination with a stationary translucent front member and intermediate screen members in such manner as to produce a specific illuminated motion effect of illusory character, such as above referred to, and including sequences extending horizontally as well as vertically; to provide such a transparency device adapted to produce simultaneously the appearance of motion in various directions at corresponding different speeds; to provide an advertising transparency of the character referred to adapted to carry a verbal message along with the pictorial expression; and more specifically to provide such a mechanism or combination of elements adapted and arranged to produce a realistic representation of the operation of combustion in a furnace, or similar effects.

An illustrative embodiment of this invention is shown in the accompanying drawings, in which:

Figure 1 is a front elevation of the transparency device showing the flame action of combustion as it takes place inside of a furnace.

Fig. 2 is a horizontal plan section on the line 2—2 of Fig. 1.

Fig. 3 is a vertical section on the line 3—3 of Fig. 2 and shows mainly a stationary, translucent, figured screen member.

Fig. 4 is a section on the line 4—4 of Fig. 2 and shows mainly a pair of upright rotary draft-propelled, figured, cylindrical screens.

Fig. 5 is a section on the line 5—5 of Figs. 2 and 4.

Fig. 6 is an enlarged axial section of the pivot device shown in the upper part of Fig. 5.

Fig. 7 is an enlarged fragmentary vertical section taken axially on one of the rotary screen members, as on the line 7—7 of Fig. 2.

Fig. 8 is mainly a plan of one of the lamps, taken for instance on the line 8—8 of Figs. 4 and 5.

Fig. 9 represents a modified form of pivot for the rotor screen.

Fig. 10 illustrates how an endless chain verbal message may be inscribed on the lower edge of the rotary screen for projection onto the fixed front screen, as upon the advertising space thereon.

In the construction shown in the drawings, the device comprises mainly a box-like housing 1, having a transparency screen 2 set in the frame-like front rim 3, a plurality of light sources 4 arranged horizontally in the back part of said housing, a set of upright rotary drum screens 5 disposed about said sources 4 respectively and a qualifying screen 6 set between the drums 5 and front screen 2. The several members 2, 4, 5 and 6 are attached demountably so as to be interchangeable with similar corresponding parts and thus accommodate ready change from one pictorial effect to another.

The animated effect is produced primarily by motion of the means 5, which means may be in any one of several different forms as will be understood. In this instance the drums 5 are each provided at the top with a screw propeller or fan 7 rigid therewith and pivoted over the corresponding lamp 4, as at 8.

The lamps are mounted uprightly in base sockets 9 in the lower part of the housing 1, where they are connected to a source of electric current, as will be understood. In order to enhance the desired effect, these lamps have suitable designs marked thereon, as for instance by means of translucent material, sometimes known as frosting or the like. In this instance the markings are in the form of vertical bands 10 on the front side, and a solid area of frosting 11 on the back side. The vertical bands cast corresponding shadows on the transparency front 2, and the frosting on the back serves to softly reflect and diffuse the light in a desirable manner. The markings referred to may be varied to meet specific needs, and the several lamps may be either marked alike or differently, according to the effect desired on the corresponding part of screen 2.

The rotor screens or drums 5 are carried by the corresponding fans 7, being suspended therefrom as shown in Fig. 5. These drums are substantially alike in general character, but are usually marked or decorated somewhat differently, as shown by drums 5' and 5", in order to produce a progressive effect from one side of the transparency to the other respecting the kind of motion to be simulated. Such differences are illustrated in Fig. 4. Each drum comprises a cylindrical roll of transparent or translucent material, as for instance celluloid, the lateral joint of which is preferably inclined, as shown at 12 on Fig. 4. By reason of this construction, the shadow produced by the joint is rendered unnoticeable, especially when the inclined markings 13 extend in the same general direction. In this instance the markings are all inclined to the direction of rotation so as to impart on the front screen 2 an appearance of upward movement, the drum movement being clockwise in plan or to the left in Fig. 4. Screen 5' has three upwardly successive zones of marking in which the pitch of the substantially spiral lines diminishes from zone to zone, as shown at 14, 15 and 16. On screen 5" there is shown a broad lower zone 17 of high pitched spiral markings and a narrow upper zone 18 of low pitched markings. The purpose and effect of these markings will be more clearly apparent in connection with the succeeding description.

The cylindrical form of the drum is maintained by means of an inner hoop 19 near the lower edge of the drum where it is secured by fastenings such as illustrated at 20. The upper part of the drum is secured to the outer ends of the fan vanes or blades 7', being secured thereto by the bent-over tips 21 of said vanes.

Each fan 7 comprises mainly a central plate or body 22 of sheet metal having the outstanding vanes 7' struck thereon and properly inclined to effect motion by reaction against ascending currents of warm air within said drums, as induced by heat from the lamps. The speed may be adjusted for a substantial range by appropriate angular setting of the vanes 7'. The center of each body part 22 is apertured and an upstanding bearing 23 is set therein consisting of an inverted cup having a hard surface, as for instance glass. This cup has an outstanding flange 24 to bear against the underside of plate 22 and is held in place by means of a clamping ring, preferably of elastic character, 25 bearing against the upper side of plate 22.

There is a supporting frame for each fan and corresponding lamp base, consisting of three uprights 26 mounted on the floor of the housing 1 and top plate 27 on the middle of which is mounted an upright post 29 having an interchangeable pivot 30 at its upper end, wherein the bearing cup 23 rests. This pivot is interchangeable to accommodate bearings of various character. For instance, if rapid rotation is desired, a hard and sharply pointed pivot 30 is used so as to eliminate practically all friction, whereas if a lower speed is desired, a softer material with a blunt point is used, adapted to provide sufficient friction to retard the fan. The wooden pivot 31 of Fig. 9 illustrates this feature. The plate 9' for the lamp base 9 is carried on the lower part of said frame.

The intermediate screen 6 is mainly translucent in character, especially the inner part, and may be made of glass or other suitable material. The outer part or border portion 32 is substantially opaque, but the inner portion 33 is nearly transparent and has transparent pictorially disposed markings thereon adapted to modify or accentuate the motion effects produced by the drum screens. In this instance the figured portion includes mainly the lower zone 34 and the upper zone 35, the former having rather irregular markings to express the violent agitation which is present closely adjacent to the fuel in a furnace, the markings being variously inclined to correspond with the confused movements of the initial flame activity, the general trend of the inclination, however, being to the left and part of the way downwardly to convey the idea of flames passing under the bridge wall of the furnace pictured on the front screen 2, and the upper zone showing substantially parallel marks inclined upwardly and to the right. The effect of these upper markings, due to the relatively low pitch of the lines 16 and 18 on the rotary screens is to simulate slow upward movement of flame and smoke toward the right. Moreover, the right half of these markings, as at 37, corresponds with the rotor 5' and those at the left, as at 38, correspond with the rotor 5". Each set of markings on screen 6 is modified in its pictorial motion effect by the markings on the corresponding rotor 5' or 5", the respective shadows of the screen 6 and corresponding rotor being superimposed on each other upon the front screen 2.

In order to prevent the light from either lamp crossing over the ends of screens 2 and 6 which are opposite the other lamp, an opaque wall or plate 39 is disposed, as shown in Fig. 2. This plate is fastened to the floor 40 by bolt 41 in the wall lugs 42. The several screen members are arranged and designed so that each furnishes its share of the light or shadow for a corresponding part of the resultant picture, and these several parts fit together or overlap sufficiently to unify the result and to so effect a common harmonious composition.

In order to accommodate ready adjustability, the bottom 40 of the box or housing is removable so that it may be replaced quickly by another bottom or base member when it is desired to re-arrange the standards which support the lamps.

The resultant motion picture shown on the front screen 2 of Fig. 1, represents the seething flames at the lower right hand corner over the fuel bed. The inrush of air from the bridge causes a confused motion of the flames which then pass downwardly and to the left under the bridge. Thus far the motion-effect is produced by the screen 5', see zones 13 and 14, as modified by the lower right part of screen 6.

The flame under the influence of screen 5" then appears to rise and turn to the right where it slows down and drifts away to the right end of the furnace where it again comes under the influence of rotor 5', the zone 16 now being effective.

Although but one specific embodiment of this invention is herein shown and described, it is to be understood that numerous details of the construction shown may be altered or omitted without departing from the spirit of this invention as defined by the following claims.

I claim:

1. In a device of the character described, a pictorially decorated translucent front wall designed to represent positionally variant moton, a source of light back of said wall, a stationary screen having pictorially arranged lines thereon successively variant horizontally as to inclination and consistent with the decoration and a horizontally movable screen having inclined lines thereon, whereby in pictorial effect combined vertical and horizontal motion is projected on said front wall member.

2. In a device of the character described, a translucent front wall having thereon a permanent pictorial representation adapted for enhancive transparency illumination from the back side, in combination with a source of light disposed behind said front wall, a stationary screen between said source and said wall, and a screen movable continuously between said source and said wall, said movable screen having zones disposed parallel with the direction of screen movement, which zones have lines disposed at mutually different angles whereby motion crosswise of said zones will be simulated at corresponding different speeds on appropriate parts of said front wall, said stationary screen having pictorially composed lines thereon extending diagonally whereby lateral motion is simulated, and said wall and stationary screen each having zones consistent in arrangement and position with the moving screen zones respectively and designed to represent motion corresponding with the purpose of the moving screen zones.

3. A motion picture apparatus of the character described comprising a translucent front wall bearing a skeletonized pictorial representation of subject matter to receive the motion effect, a plurality of light sources behind said wall and arranged to illuminate corresponding parts thereof respectively, a fragmentarily pictured screen interposed between said wall and said light sources in complementary relation to the front wall picture figured rotary screens surrounding said sources respectively whereby shadows projected by said screen may be carried across corresponding portions of said wall, and an opaque partition disposed between said light sources and arranged to prevent overlapping of the light rays from said sources on said wall.

4. In a transparency device, a plurality of lamps and a pictorial front screen, in combination with a plurality of intermediate screens having markings thereon disposed at different angles of inclination, whereby movements of different apparent velocity and direction are produced on corresponding parts of the front screen, said intermediate screens including a rotary drum screen for each of said lamps and a fixed common screen pictorially marked to enhance the pictorial effect on the front screen.

5. In a motion picture device of the character described, a permanently pictured translucent front screen, a lamp behind said screen, and plurality of screens interposed between said lamp and said front screen, one of said intermediate screens being movable continuously in one direction horizontally and another being stationary, said movable screen having in horizontal succession alternately arranged inclined portions which are relatively opaque and light transmitting respectively to express direction and speed of motion vertically, and said stationary screen having pictorially composed alternately arranged portions which are relatively opaque and transparent respectively to produce corresponding effects as to speed and direction horizontally, whereby various composite speed and direction effects are produced on corresponding picture parts of said front screen.

Signed at Chicago, Ill., this 3rd day of March, 1926.

HARRY B. BARKER.